US008538945B1

(12) United States Patent
Ogilvie

(10) Patent No.: US 8,538,945 B1
(45) **Date of Patent: *Sep. 17, 2013**

(54) TAILORED INTERGENERATIONAL HISTORIC SNAPSHOTS

(76) Inventor: John Ogilvie, Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/527,553

(22) Filed: Jun. 19, 2012

(51) Int. Cl.
*G06F 17/30* (2006.01)

(52) U.S. Cl.
USPC .......................................... 707/706; 707/732

(58) Field of Classification Search
USPC ................................................. 707/706, 732
See application file for complete search history.

(56) References Cited

U.S. PATENT DOCUMENTS

| | | | | |
|---|---|---|---|---|
| 7,702,542 | B2 * | 4/2010 | Aslanian, Jr. | 705/14.73 |
| 7,944,445 | B1 * | 5/2011 | Schorr et al. | 345/440 |
| 8,072,457 | B2 * | 12/2011 | Schorr et al. | 345/440 |
| 8,224,817 | B2 * | 7/2012 | Ogilvie | 707/732 |
| 8,232,997 | B2 * | 7/2012 | Schorr et al. | 345/440 |
| 8,341,139 | B1 * | 12/2012 | Ogilvie et al. | 707/706 |
| 2002/0002558 | A1 * | 1/2002 | Krause | 707/104.1 |
| 2007/0005580 | A1 * | 1/2007 | Rinearson et al. | 707/3 |

OTHER PUBLICATIONS

"1000memories is the new shoebox for your old photos", retrieved from <<http://1000memories.com/about>>, retrieved Aug. 13, 2012, 2 pages.
"Get Organized On-The-Go", retrieved from <<http://www.aboutone.com/product-tour/mobile-apps/google-android-app/>>, retrieved Aug. 13, 2012, 3 pages.
"JustFamily", retrieved from Apple iTunes(R) store and from <<http://justfamily.com>> website, retrieved Aug. 13, 2012, 2 screenshots, 1 page.
"MobileTree: Family history for a mobile community", retrieved from <<http://mobiletree.me/mt_product_info.php>>, copyright date 2009, 1 page.

* cited by examiner

*Primary Examiner* — Debbie Le
(74) *Attorney, Agent, or Firm* — Ogilvie Law Firm

(57) ABSTRACT

A tailored intergenerational historic snapshot message informs a younger person about the world an older person lived in when they were young. The older person's age and the younger person's age are used to identify a historic time period in which the older person was the same age as the younger person. A circumstance which occurred in the historic time period is selected from a database or web search result. The message is tailored to the ages of the people involved. The message may also be tailored to recite circumstances specific to a topic area or a geographic location.

20 Claims, 3 Drawing Sheets

TAILORED INTERGENERATIONAL HISTORIC SNAPSHOTS

RELATED APPLICATION

The present application claims priority to, and incorporates by reference, U.S. provisional patent application No. 61/012,430 filed Dec. 8, 2007 and U.S. patent application Ser. No. 12/244,570 filed Oct. 2, 2008. The present application is a continuation of application Ser. No. 12/244,570, which is now U.S. Pat. No. 8,224,817 issued Jul. 17, 2012.

BACKGROUND

Some online services offer reminders of birthdays, anniversaries, and other life events. Some allow a user to create an electronic birthday card, sympathy card, anniversary card, or other greeting card. The electronic card may be based on a template, which is customized with text and photos provided by the user. The customized electronic card is then emailed to a recipient.

Genealogical databases available online may allow identification of ancestors going back multiple generations. Genealogy may begin with work identifying members of a family tree, but it often extends beyond mere lineage and location data into an investigation of the life events, living conditions, and personal history of one's ancestors. A family history is a narrative of the lives of people in a particular family. Personal correspondence, newspapers and other contemporaneous publications, legal records, religious records, and oral history narratives may each provide insight into someone's life years ago.

This background was drafted with the present invention in mind. One of skill would not necessarily have combined any or all of the concepts that are presented together here.

SUMMARY

A tailored intergenerational historic snapshot message helps inform a younger person about the world an older person lived in when they were young. For instance, a message may list several circumstances in the older person's life from a time when the older person was the same age as the younger person is now, such as technology advances or political events from that time period. In some embodiments, the older person's age and the younger person's age are first used to identify a historic time period in which the older person was the same age as the younger person. A circumstance which occurred in the historic time period is then selected from a database, web search results, or another data source. An intergenerational historic snapshot message is then generated, tailored to the ages of the older and younger persons. The message may also be tailored to describe circumstances specific to a topic area such as music or sports, or circumstances specific to a particular geographic location such as the older person's home town or the younger person's current state of residence. The tailored message informs the younger person about one or more circumstances that occurred when the older person was approximately the younger person's age, thereby helping the younger person better understand the world the older person lived in at the time.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
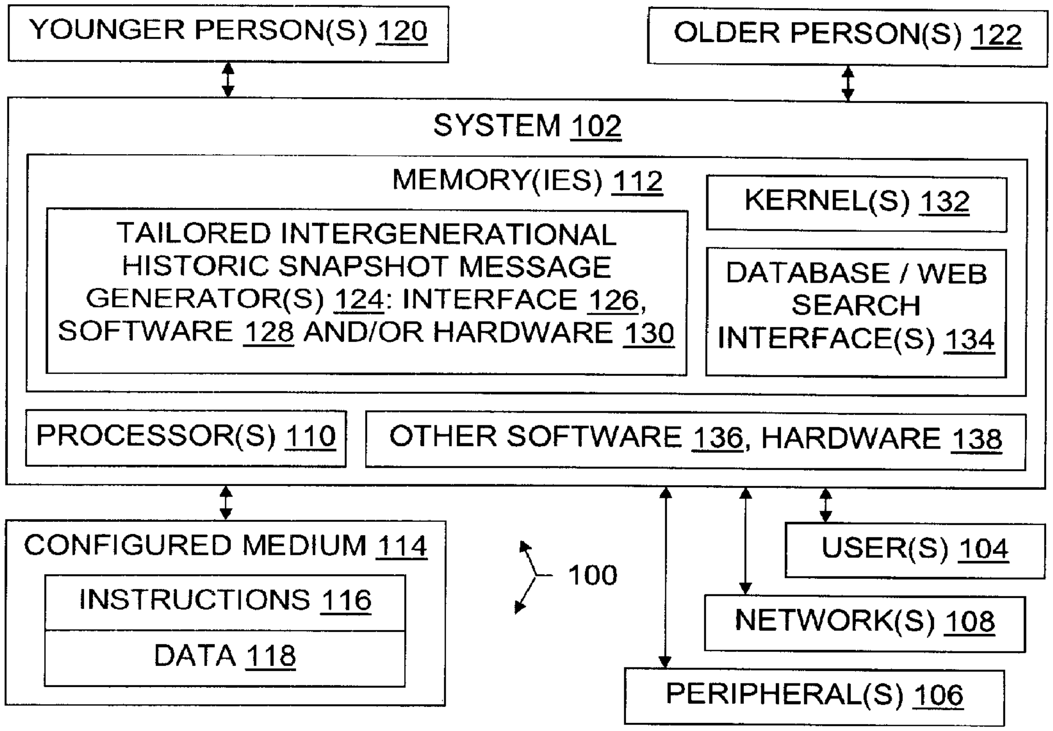
FIG. 1 is a block diagram illustrating a system having a memory configured with a tailored intergenerational historic snapshot message generator and other items in an operating environment, and also illustrating configured storage medium embodiments.

Embodiments described here provide tools and techniques for strengthening family bonds and helping people better understand the world in which their older family members grew up. In particular, some embodiments automatically create messages which can help a younger person connect with an older person by identifying historic events that occurred in the older person's world when the older person was the same age as the younger person is now. The selection of events identified can be tailored expressly by subject matter and/or filtered according to the age or location(s) of the people involved.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises the right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or machine(s) providing one or more processors controlled at least in part by instructions. The instructions may be in the form of software in memory and/or specialized circuitry. In particular, although it may occur that many embodiments run at least partially on workstation or laptop computers, other embodiments may run on other computing machines, and any one or more such machines may be part of a given embodiment. A computer system is sometimes simply referred to as a "system".

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreading may be implemented, for example, by running different threads on different cores in a multiprocessing environment, by time-slicing different threads on a single processor core, by running on more than one machine, and/or by some combination of time-sliced and multi-processor threading.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors.

"Kernels" include operating systems, hypervisors, virtual machines, and similar hardware interface software.

"Code" means processor instructions, data (which includes data structures), or both instructions and data.

Whenever reference is made to data or instructions, it is understood that these items configure a computer-readable memory, as opposed to simply existing on paper, in a person's mind, or as a transitory signal on a wire, for example.

A list may be "displayed" by a system visually, audibly, and/or tactilely.

A "circumstance" may be an event, or it may be a condition or state. For example, the first medical use of penicillin is an event, the price of a gallon of gasoline is an economic condition or state, and each of these is a circumstance.

"Personal history information" includes information pertaining to the circumstances of a particular person's life. Aspects of personal history information may be publicly known or previously recorded in publically accessible data sources, but personal history information also includes anecdotal, autobiographical narrative, and/or previously private information about the life of the person in question.

A "familial relationship" is a description of the relationship (s) between two or more people in a family, such as grandparent, cousin, aunt, uncle, father, mother, brother-in-law, sister-in-law, or the like.

A "family group" is particular example of a family. All people in a family group are related by blood, legal adoption, or marriage within a span of at most four generations.

Unless otherwise indicated, "age" means a person's age in years. An "indication" of a person's age means information from which the person's age can be calculated, such as the person's birth year, their full birth date, their age relative to another person whose age is known or can be calculated, or a statement of the person's age at a specified time.

Unless otherwise indicated, two ages are the "same" if they are within twelve months of each other. Similarly, unless otherwise indicated two ages are "approximately" the same if they are within three years of each other.

An event occurred "within" a period if any portion of the event occurred during the period.

A message "discloses" certain information if it makes that information clear to the message recipient, regardless of whether the recipient already knew some or all of the information being disclosed. The use of particular phrasing is not required in the message, so long as the information said to be disclosed is conveyed to the recipient. The message may also contain other information beyond the information said to be disclosed.

A message may be "electronically transmitted" via email, fax, blog posting, text message, synthesized voice communication, voicemail, or the like.

Throughout this document, use of the optional plural "(s)" means that one or more of the indicated feature is present. For example, "circumstance(s)" means "one or more circumstances" or equivalently "at least one circumstance".

Operating Environments

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. Automated agents may also be users 104. Storage devices and/or networking devices may be considered peripheral equipment in some embodiments. Other computer systems (not shown) may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. Memories 112 may be of different physical types. Tailored intergenerational historic snapshot message generators 124 and other items shown in the Figures may reside partially or entirely within one or more memories 112, thereby configuring those memories.

Persons 120, 122 may submit information to the system 102 for use by a message generator 124 and/or may receive messages generated by the message generator 124.

The message generator 124 includes an interface 126 through which the message generator 124 receives information and commands, and provides generated messages. The message generator 124 may be implemented in software 128 and/or hardware 130. The illustrated message generator 124 accesses peripherals 106, networks 108, and other resources with the assistance of a kernel 132 such as an operating system. The illustrated message generator 124 uses interfaces 134 to access databases and web search engines to locate circumstance information. Other application programs and other software 136 and other hardware 138 (buses, power supplies, network interface cards, etc.) than that already enumerated may also be present.

In some embodiments, peripherals 106 such as human user I/O devices (screen, keyboard, mouse, microphone, speaker, motion sensor, etc.) will be present in operable communication with one or more processors 110 and memory 112. In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Systems

Figure 2:
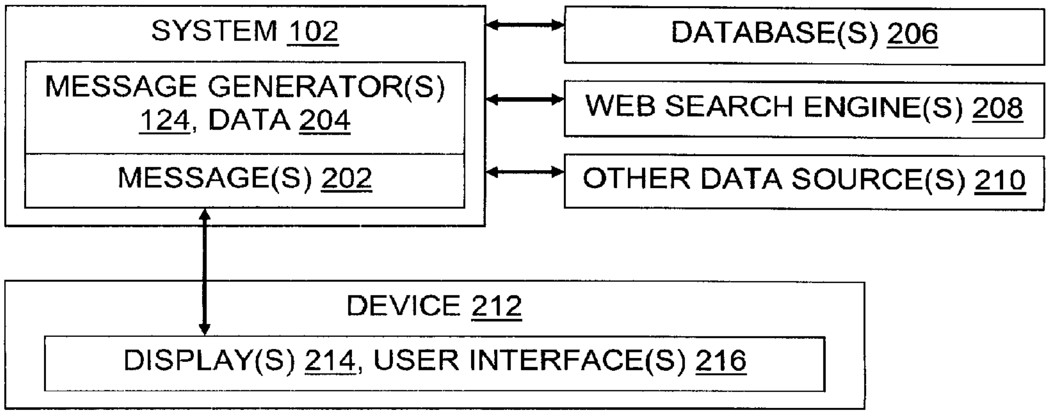
FIG. 2 is a block diagram illustrating a configuration in which tailored intergenerational historic snapshot messages are generated on a system which communicates with users through a remote device.

Referring now to FIGS. 1 and 2, some embodiments provide a system 102 having a processor 110 in operable communication with a memory 112 that contains a message generator 124 and/or messages 202 generated by a message generator 124. In some embodiments, data 204 such as selected circumstances, personal history information, topical preferences, geographic location information, age indications, usernames, passwords, and/or email addresses are also present in memory 112. Some embodiments are configured to select circumstances by querying one or more databases 206, using topics, geographic locations, and/or time periods as keys or indexes.

Some embodiments are configured to select circumstances by contacting one or more web search engines 208, using topics, geographic locations, and/or time periods as search terms. Some embodiments use other data sources 210, such as recorded anecdotes, photographs supplied by a user, and/or text supplied by a user, when generating messages 202.

The configuration illustrated in FIG. 2 includes a remote device 212, such as a computer network client or a mobile phone or other local system 102 which is in communication (intermittent or continuous) with a remote system 102 such as a server. In this configuration, the remote device(s) 212 act mainly to provide displays 214 and other interfaces 216 engaged by a user 104 and/or other persons 120, 122, while the remote system 102 selects circumstances and otherwise generates messages 202.

Examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

Bearing these caveats in mind, in some embodiments an email message 202 is automatically generated by the generator 124 and sent to one or more persons 120, 122, 104. In one embodiment, the email message has the following general format:

To: <Younger>

From: <Caregiver>

Cc: <Elder>

Subject: "When <Elder> was your age . . . "

"Dear <Younger>, I thought you might like to know some ways the world has changed since <Elder> was your age. When <Elder> was <Younger Age>, in the year <Elder Birthdate +Younger Age>, <Subject-specific event recitation(s)>. Love, <Caregiver>"

For example, a parent might subscribe to a service which automatically generates and sends to the parent's child, each year on the birthday of the child's grandparent, an email reminder message 202 about the grandparent's birthday which also describes a historic event that occurred the year the grandparent was the same age as the child currently is. In the FIG. 1 configuration, the parent acts as a user 194, the child is a younger person 120, and the grandparent is an older person 122. The historic event could be from a topic-specific chronological database 206 of events, with the topic (sports, technology, music, etc.) specified by the parent.

In some embodiments, multiple people can be involved, e.g., two or more <Elder> persons 122 in one message 202, two or more <Younger> persons 120 in one message 202, and some people could be Bcc'd as well as Cc'd. In some embodiments, other people familiar to <Younger> also provide snapshot ages, e.g., "When Uncle Bob was your age (11), <X> had just been invented, and when Uncle Bob was your brother's age (14), <Y> made the first successful <Z>."

In some embodiments, an <age> is defined by input data 204 in the form of a complete birthdate (day, month, and year), a partial birthdate (month and year, season and year, or year, for example), and/or an age (specified, e.g., in years).

In some embodiments, a subject database 206 from which an event is chosen contains event listings pertaining to a relatively broad topic, such as sports, politics, religion, fashion, or the like. In some embodiments, the subject database 206 is relatively narrow, e.g., containing events in Rock & Roll History, events in the life of one or more specified celebrities or other famous persons, numismatic events such as coin mintings, and so on. In some embodiments, topical keywords are included in web search engine 208 queries to provide a similar effect, namely, obtaining circumstance description(s) pertinent to particular specified topic(s).

In some embodiments, in place of or in addition to an automatically generated email message 202, a message 202 is automatically generated in another format, e.g., cell phone text message, synthesized voice recording, online instant message, visual text and graphics, and so on.

In some embodiments, GPS technology, geolocation tools, and/or other location-approximating technology is used and results are incorporated into the event database 206 lookup, the web search engine 208 query, and/or the text or images in the generated message 202. Former geographic location(s) and other personal history of the <Elder> and/or other people may also be used in generating messages 202. For example, messages such as the following might be automatically generated:

"When Grandpa was your age, he lived <distance> miles from where you are right now."

"When Uncle Fred was your age, <Metropolis> only had <population at the time of closest census date to historic date> people in it. A car cost <historic cost at about that historic date>, but a full day of hard work only paid <historic wage>".

"On your Grandmother's birthday when she turned <same age as child is now>, the <local city> newspaper front page headline was '<headline.'."

In some embodiments, the message 202 is automatically generated and sent to a subscriber user first, e.g., a parent, and is subsequently sent to the <Younger> only if the subscriber approves of the message content. In some embodiments, a subscriber user such as a <Caregiver> has the option of editing the automatically generated message before it is sent (by the system or by the subscriber, as the case may be) on to anyone else.

In some embodiments, the message is automatically generated and sent on a specified date, such as an <Elder> birthday, a <Younger> birthday, or a <Caregiver> birthday.

Embodiments may be configured in various ways, e.g., as processes and/or hardware on a server computer, on a client or peer, or on a standalone computer, software (data instructions) in RAM or permanent storage for performing a process, with general purpose computer hardware configured by software, special-purpose computer hardware, data produced by a process, and so on. Computers, PDAs, cell phones, and any other device 212 having user interface and some network transmission capabilities may be part of a given embodiment. Touch screens, keyboards, other buttons, levers, microphones, speakers, light pens, sensors, scanners, and other I/O peripheral 106 devices may be configured to facilitate or perform operations to achieve the methods and systems, and method results, which are described here. Combinations of these may also form a given embodiment. Terms such as "computerized" refer to devices having a microprocessor and memory, not merely to personal computers or servers. "Electronic" refers to digital and/or analog electronic circuitry. "Automatic" means without requiring ongoing real-time human input or guidance to perform the immediately contemplated operation.

Methods

Figure 3:
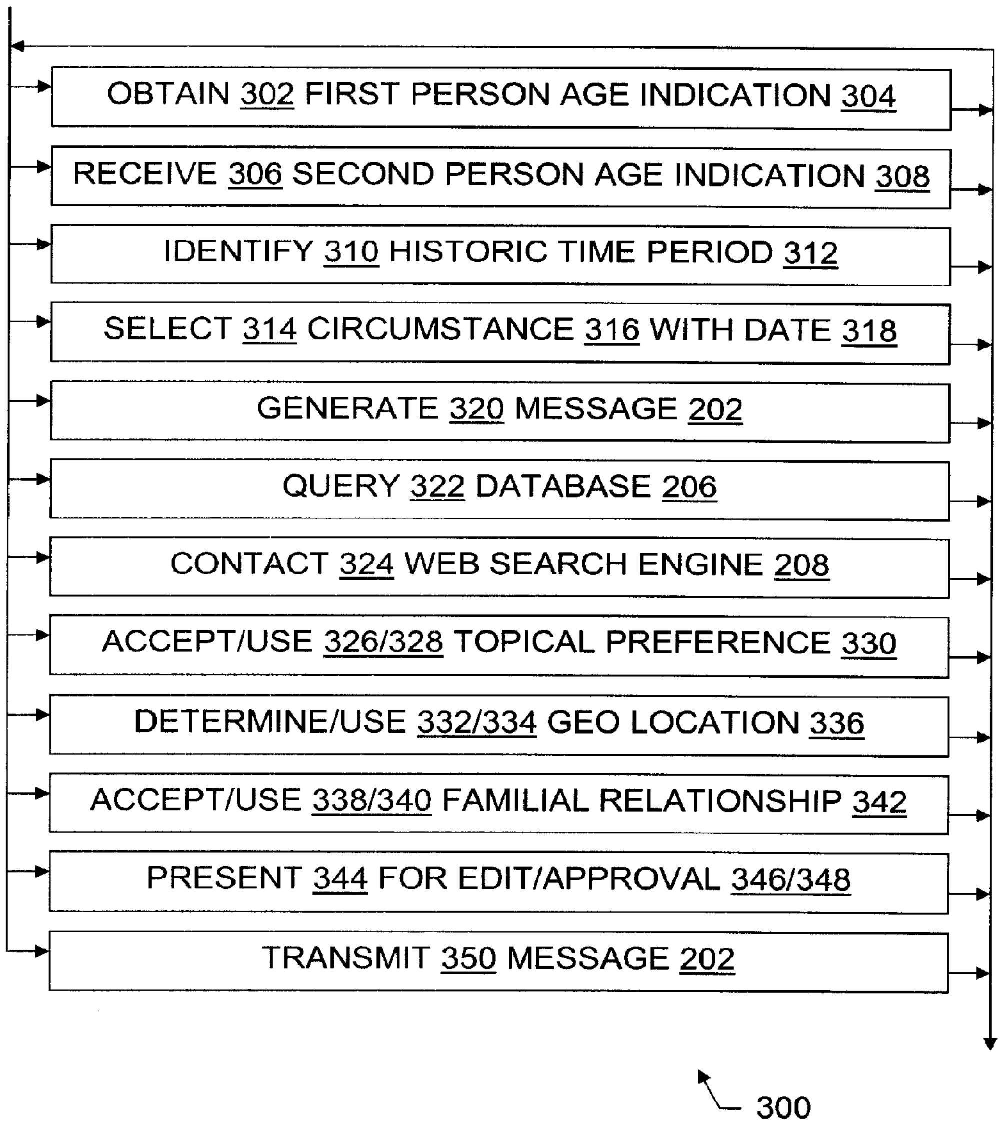
FIG. 3 is a flow chart illustrating steps of some method and configured storage medium embodiments, from a system perspective.
Figure 4:
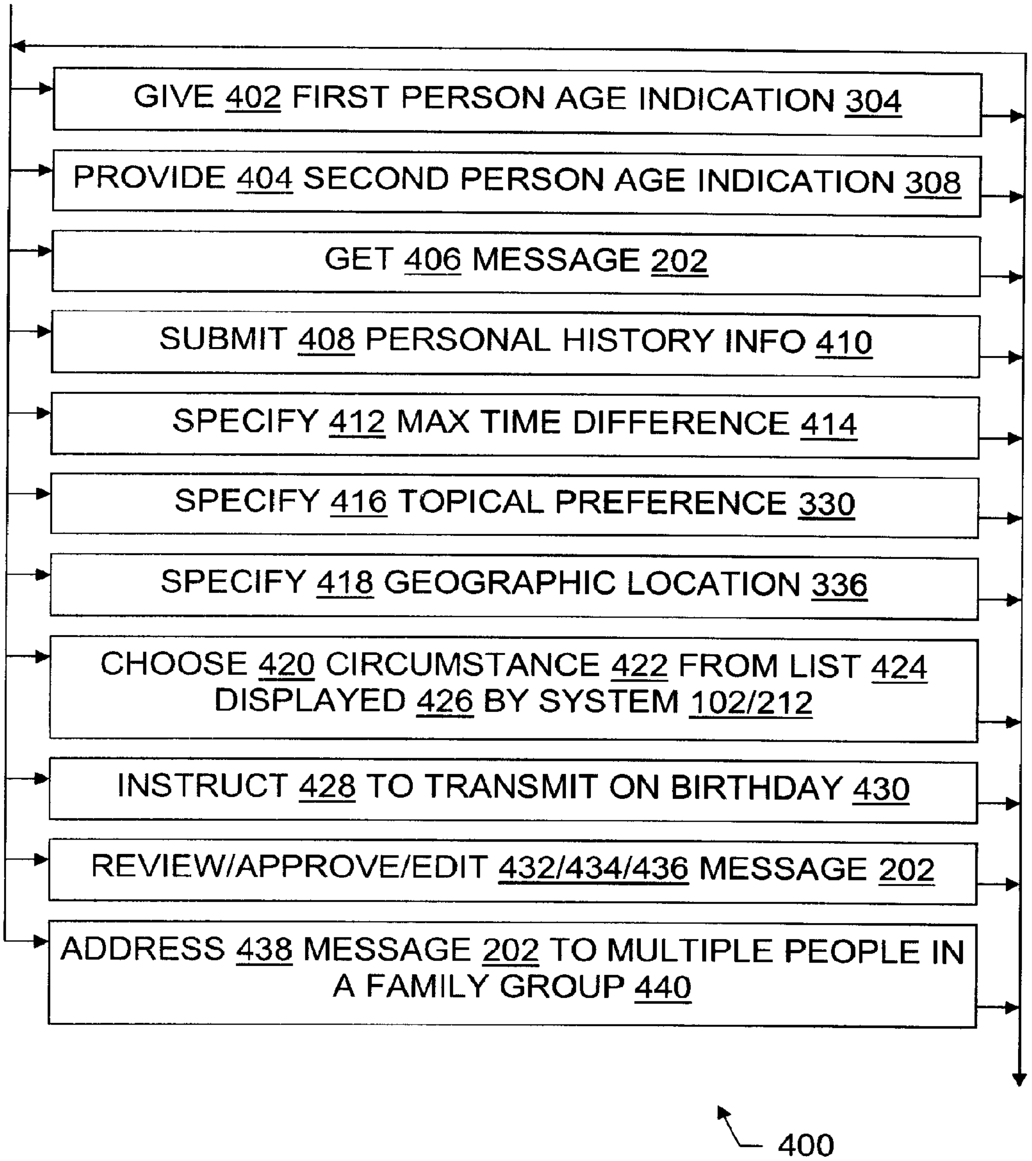
FIG. 4 is a flow chart illustrating steps of some method and configured storage medium embodiments, from a user perspective.

FIGS. 3 and 4 illustrate some method embodiments, in flowcharts 300 and 400, respectively. Methods shown in the Figures may be performed in some embodiments automatically, e.g., by a message generator 124 that has been initialized with data 204 and designed to operate with little or no further user input. Methods may also be performed in part automatically and in part manually unless otherwise indicated.

In a given embodiment zero or more illustrated steps of a method may be repeated, perhaps with different parameters or data to operate on. Steps in an embodiment may also be done in a different order than the top-to-bottom order that is laid out in FIG. 3 and in FIG. 4. Steps may be performed serially, in a partially overlapping manner, or fully in parallel. The order in which a flowchart is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flows, provided that the method performed is operable and conforms to at least one claim. A given method may include steps from either or both of these Figures.

FIG. 3 illustrates steps from the perspective of a configured computer system, device, or other embodiment.

During an obtaining step 302, an embodiment obtains an indication 304 of a first person's age, such as their birth date (the current date is implicitly known) or a statement that they are N years old, for some value of N, for example. The indication 304 may be obtained interactively through a GUI or other user interface, or received through a network transmission, or read from a file, for example.

During a similar receiving step 306, the embodiment receives another age indication, namely an indication 308 of a second person's age. The same type of mechanisms and procedures may be used in receiving step 306 as in obtaining step 302. It will also be understood that the order in which the age indications are received is not critical—the younger person's age may be indicated to the embodiment before the older person's age is indicated, or vice versa, or the two may be indicated together.

During an identifying step 310, an embodiment identifies a historic time period 312 in which the older person was approximately the same age as the younger person's age. As one example, if the persons' ages are 88 and 18, time periods are each two years long, and the current year is 2008, then by arithmetic calculation step 310 could identify 1936-1938 or 1938-1940 as a suitable historic time period (calculate 2008 minus 88 plus 18 to get 1938 and then select a period that includes 1938). As another example, if the persons' ages are 53 and 13, time periods are each one year long, and the current year is 2008, then by arithmetic calculation step 310 could identify 1968 as a suitable historic time period (2008 minus 53 plus 13 equals 1968). Historic time periods need not all be of the same duration, and may be measured in units other than years; period descriptors could be stored in a list or table and selected based on their beginning and ending dates. In some embodiments, a historic time period has a span (e.g., beginning date and ending date, or beginning date and length) and a list describing circumstances 316 which occurred during the period. Each circumstance description includes a textual, visual, and/or audible portion for potential inclusion in a message 202. Each circumstance may include topical markers (sports, politics, technology, etc.), and may have an associated geographic occurrence location (city, state, region, province, country, etc.). In addition to being associated with a historic time period, the circumstance may also have a displayable specific occurrence date within the period's span.

During a selecting step 314, an embodiment selects a circumstance 316 from a time period 312. The circumstance has a date 318, which may be either the time period's span or a more specific occurrence date within that span. Selection may be made completely randomly from the circumstances associated with the time period 312, or selection may be based at least in part on topical markers and/or geographic location and/or specific occurrence date, for example.

During a generating step 320, an embodiment generates a message 202 by using a template (procedural, textual, XML/HTML, etc.) which the embodiment fills in with selected circumstance descriptions, age indications, recipient and other persons' names, and destination addresses, for example.

During a querying step 322, an embodiment queries a database 206 of circumstances to obtain one or more circumstance descriptions to insert in a message 202. The query may key off values such as the historic time period, topical preferences (enumerated categories and/or free-form keyword searches), and geographic locations in which circumstances occurred.

During a web search engine contacting step 324, an embodiment contacts a web search engine 208 with a search request to obtain one or more circumstance descriptions to insert in a message 202. The search engine may be a general-purpose engine such as the Google® search engine, or a more specialized search engine such as the USPTO search engine.

The search may search the web generally and/or specifically identified websites, and the search may use keywords tending to produce search results for a historic time period, for preferred topics, and for particular geographic locations.

During a topical preference accepting step 326, an embodiment accepts at least one topical preference. Topical preferences 330 may be conveyed interactively to an embodiment, through a user interface, or they may be defaults read from a configuration file, for example. Topical preferences 330 may be given as enumerated categories, or in a free form as keywords, again depending on the particular embodiment.

During a topical preference using step 328, an embodiment uses at least one topical preference, e.g., while querying 322 a database or contacting 324 a search engine.

During a geographic location determining step 332, an embodiment determines at least one geographic location, such as a message 202 recipient's location, or an older person's location at the time they were approximately the age of a younger person. A geographic location 336 may be conveyed interactively in an embodiment, through a user interface, may be a default read from a configuration file or from submitted personal history information, or may be determined by geolocation technology using IP addresses and other data, for example. A geographic location 336 determined through user input or configuration file content may be given as an enumerated value from a list such as zip codes or country names, or in a free form as keywords, again depending on the particular embodiment.

During a geographic location using step 334, an embodiment uses at least one geographic location, e.g., while querying 322 a database or contacting 324 a search engine.

During a familial relationship accepting step 338, an embodiment accepts at least one familial relationship description. Familial relationships 342 may be conveyed interactively to an embodiment through a user interface, for example. Familial relationships 342 may be given as enumerated values, or in a free form as keywords, again depending on the particular embodiment.

During a familial relationship using step 340, an embodiment uses at least one familial relationship while filling in a template to form a message 202.

During a presenting step 344, an embodiment presents a user with a draft message 202, which in some embodiments the user may then edit 346 and approve 348 prior to transmission 350 of the message. The message may be transmitted 350 to recipients such as the older person and the younger person whose relationship is a motivation for causing generation of the message 202.

FIG. 4 illustrates steps from the perspective of a user 104.

During a first age indicating step 402, a user gives a system or device (e.g., handheld device interfacing to a remote system) a first person's age indication 304.

During a second age indicating step 404, a user provides the system or device a second person's age indication 308. The age indications may come from different users, e.g., a grandchild and a grandparent may each enter their own age. Also, the older person's age may be entered first in some cases, while the younger person's age is entered first in other cases. Also, more than two ages may be entered, in at least two ways: multiple ages for a given person entered to provide a sequence of life snapshots; multiple persons' ages entered, such as the ages of two grandparents and a grandchild, or of a grandparent and several grandchildren. Steps 402 and 404 correspond generally to steps 302 and 306, albeit from a different perspective.

During a message getting step 406, a recipient gets a generated message 202, through email, synthesized voicemail, short text message, fax, and/or other electronic transmission mechanism(s). Step 406 may be a result of step 320 and/or step 350.

During a submitting step 408, a person submits a description of their personal history 410 to a system or device, for including in a database 206 for possible use in generating messages 202. For instance, an older person may submit a chronology listing geographic locations and corresponding residence dates, and/or a free-form text anecdote (possibly with attached images/sounds) recalling circumstances from a particular historic period.

During a time difference specifying step 412, a user specifies a maximum time difference 414 for the system to use. In some embodiments, for example, two ages are the "same" if they are within twelve months of each other, unless otherwise indicated. Similarly, unless otherwise indicated two ages are "approximately" the same if they are within three years of each other. Historic time period spans may also be specified 412, effectively setting the maximum time difference between a given circumstance's occurrence date and the time at which the older person was the younger person's age.

During a topical preference specifying step 416, one or more topical preferences are specified for circumstance descriptions used to tailor messages 202. Step 416 corresponds with step 326 in the ways topical preferences can be conveyed to a system.

During a geographic location specifying step 418, one or more geographic locations are specified for tailoring messages 202. Step 418 corresponds with step 332 in the ways geographic locations can be conveyed to a system.

During a circumstance choosing step 420, a user chooses for inclusion in a message 202 at least one circumstance description 422 from a list 424 of circumstance descriptions that is displayed 426 by a system 102 directly or through a remote device 212. The list 424 may be in the form of a drop-down list, links, editable text, selectable photos, or an audible recitation, for example. The list 424 may include entire circumstance descriptions, or mere summaries or excerpts of the circumstance descriptions that are available for insertion in the message. The list (like other system output) may be displayed 426 visually on a screen, tactilely on a Braille output peripheral, or audibly through a speaker, for example. The user's choice(s), like other system input, may be entered in the system or device by the user through a touch screen, mouse, voice command, or other input mechanism. The circumstances offered to the user may be selected 314 by the system as discussed above, obtained by database query 322 and/or from web search engine 208 results, for example, may include personal history info 410, and may be selected based in part on topical preference(s) 330 and/or geographic location(s) 336.

During an instructing step 428, a user instructs a system (possibly via a remote device) to transmit a message 202 on a particular transmission date 430, e.g., a birthday. The transmission date is not necessarily the same as the date(s) on which the message 202 is generated 320. A system may be instructed to transmit a message 202 to different recipients on different dates. The transmission date may be specified directly in a calendar format (e.g., Jan. 1, 2010, or "3 days from today"), or the transmission date may be specified in a symbolic format (e.g., "Grandma's Birthday" or "Pat and Mike's Anniversary").

During respective steps, a user reviews 432, approves 434 for transmission, and/or edits 436 a message 202, which may be a draft message and is thus not necessarily complete or in the final form seen by recipients. Review 432 may include visually and/or audibly receiving the message 202 from the system, possibly through a remote device. Approval 434 or disapproval may be indicated by a button press, mouse click, voice command, or other input mechanism. Editing 436 may include choosing 420 a circumstance, specifying time differences, topical preferences, and/or geographic locations, altering a template into which selected 314 circumstance descriptions are placed, specifying recipient addresses, and/or adding personalizing text, images, voice recorded greetings or other sounds, for example.

During an addressing step 438 a user addresses a message 202 to multiple people in a family group 440. Recipients may be identified to the system by their email addresses or phone numbers directly, or recipients may be specified symbolically by name or relationship, e.g., "Bobby" or "My Grandkids".

Some embodiments provide a method of producing a tailored intergenerational historic snapshot message 202, including the steps of: obtaining 302 an indication 304 of a first person's age (e.g., an older person); receiving 306 an indication 308 of a second person's age (e.g., a younger person); identifying 310 a historic time period 312 in which the older person was the same age as the younger person's received age (which is not necessarily the younger person's current age); selecting 314 at least one circumstance 316 having an occurrence date 318 in the historic time period; and automatically generating 320 a tailored intergenerational historic snapshot message 202 (possibly in draft form subject to approval and editing) that discloses via a circumstance description that the selected circumstance occurred when the older person was approximately the younger person's age.

In some embodiments, the indication 304, 308 of a person's age is given in years. In some, the indications are obtained in a different order than the order illustrated in FIG. 3. In some embodiments, the historic time period 312 satisfies at least one of the following conditions: it is not greater than two months, not greater than six months, not greater than one year, not greater than two years, not greater than five years, not greater than ten years. In some, selecting 314 at least one circumstance includes querying 322 a database and/or contacting 324 a web search engine. In some, the embodiment selects a circumstance based at least in part on a user-specified topical preference 330 and/or user-specified geographic location 336. Some embodiments present 344 the message to a user for editing and/or approval. The message may be electronically transmitted 350 by a given embodiment to at least the younger person, and in some cases is transmitted to other people as well. The message may disclose, by text, graphics or audible display, a familial relationship between the older person and the younger person.

Some embodiments provide a method of requesting a tailored intergenerational historic snapshot message 202, including the steps of: directly or indirectly giving 402 a system 102 an indication of a first person's current age (e.g., the older person); providing 404 the system with an indication of a second person's current age (e.g., the younger person); and then getting 406 from the system a tailored intergenerational historic snapshot message (possibly in draft form) which discloses when displayed that a particular selected circumstance 316 occurred when the older person was approximately the younger person's current age.

Some embodiments include submitting 408 to the system personal history information of the older person for potential inclusion in the automatically generated message 202 as a circumstance description. Some include specifying 412 to the system how close in time the particular circumstance should be to a date when the older person was the younger person's current age. Some include specifying 416 to the system a topic 330 to be used in selecting the particular circumstance, such as for example, a topic in at least one of the following topic categories: sports, technology, music, films, fine arts, literature, famous people, war, crime, exploration, fashion, automobiles, transportation, engineering, politics, economics, books, law, science, business, religion, philosophy, travel, food, adventure, hobbies. Some embodiments include specifying 418 to the system a geographic location 336 to be used in selecting the particular circumstance. In some embodiments, a user chooses 420 one or more particular circumstances from a list 424 displayed by the system. Some include instructing 428 the system to send the message on a date that is the birthday of at least one of the following: the younger person, the older person, a person instructing the system. Some include reviewing 432 the message 202 and then approving 434 the message, in response to an inquiry from the system; some include editing 436 the message before it is sent to the younger person. Some embodiments allow a user to address 438 the message to multiple people in a family group.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as a message generator 124, message generation source data 204, and/or tailored intergenerational historic snapshot messages 202, in the form of data 118 and instructions 116, read from a removable medium 114 and/or another source such as a network connection, to form a configured medium. The configured memory 112 is capable of causing a computer system to perform method steps for generating and/or requesting tailored intergenerational historic snapshot messages as disclosed herein. FIGS. 1 through 4 thus help illustrate configured storage media embodiments and method embodiments, as well as system and method embodiments. In particular, any of the method steps illustrated in FIG. 3 and/or FIG. 4, or otherwise taught herein, may be used to help configure a storage medium to form a configured medium embodiment.

Conclusion

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 and 4 also help describe configured media, and help describe the operation of systems and devices like those discussed in connection with FIGS. 1 and 2. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer system comprising:

a processor;

a memory containing a template for an intergenerational historic snapshot message, the template comprising multiple predefined text and parameter portions;

the memory also containing code with instructions which, upon execution, control the processor by obtaining an indication of an older person's age and receiving an indication of a younger person's age, identifying a historic time period, selecting a historic circumstance having an occurrence date in the historic time period, and automatically generating a tailored intergenerational historic snapshot message based on the template and including a plurality of the predefined text and parameter portions with the parameters filled in, the message disclosing that the selected historic circumstance occurred when the older person was within a specified amount of the younger person's age, the message including at least one predefined text portion which is predefined in that it was defined in the template before the age indications were received and before the historic time period was identified and before the historic circumstance was selected, predefined text of the predefined text portion(s) being interleaved with filled in parameters in the message to form sentences in the message.

2. The computer system of claim 1, wherein the system comprises a personal computer.

3. The computer system of claim 1, wherein the system comprises a mobile phone.

4. The computer system of claim 1, wherein the system comprises a networking device.

5. The computer system of claim 1, wherein the system comprises a web search engine interface and the memory contains code with instructions which, upon execution, control the processor by automatically including within the generated tailored intergenerational historic snapshot message historic circumstance information obtained from a web search engine.

6. The computer system of claim 1, wherein the system comprises a database interface and the memory contains historic circumstance information obtained via the database interface.

7. The computer system of claim 1, wherein the historic time period is not greater than two years.

8. The computer system of claim 1, wherein the historic time period is not greater than five years.

9. The computer system of claim 1, wherein the code selects a historic circumstance based at least in part on a user-specified topical preference.

10. The computer system of claim 1, wherein the code determines a geographic location, and selects a historic circumstance based at least in part on the geographic location.

11. The computer system of claim 1, wherein the code presents the message to a user for editing.

12. The computer system of claim 1, wherein the system electronically transmits the message to at least the younger person.

13. The computer system of claim 1, wherein the message also discloses a familial relationship between the older person and the younger person.

14. The computer system of claim 1, wherein the memory contains personal history information of the older person available to the code for inclusion in the automatically generated message.

15. The computer system of claim 1, wherein the memory contains a topic to be used in selecting the particular historic circumstance, and the topic overlaps at least one of the following topic categories: sports, technology, music, films, fine arts, literature, famous people, war, crime, exploration, fashion, automobiles, transportation, engineering, politics, economics, books, law, science, business, religion, philosophy, travel, food, adventure, hobbies.

16. The computer system of claim 1, wherein a list of historic circumstances is displayed by the system.

17. The computer system of claim 1, wherein the system includes an instruction to send the message on a date that is the birthday of at least one of the following: the younger person, the older person, a person instructing the system.

18. The computer system of claim 1, wherein the message is addressed to multiple people in a family group.

19. The computer system of claim 1, wherein at least three of the following kinds of data are present in the memory: selected historic circumstances, personal history information, topical preferences, geographic location information, age indications.

20. The computer system of claim 1, wherein at least one of the following is present in the memory and included in the message: a recorded anecdote, a photograph supplied by a user.

* * * * *